United States Patent [19]

Cox

[11] Patent Number: 4,781,498

[45] Date of Patent: Nov. 1, 1988

[54] ADJUSTABLE LOAD RETAINER AND RETENTION MEANS FOR USE IN A TRANSPORT VEHICLE

[76] Inventor: Joseph W. Cox, 235 Wilson Street West, Ancaster, Ontario, Canada, L9G 3N4

[21] Appl. No.: 940,865

[22] Filed: Dec. 12, 1986

[30] Foreign Application Priority Data

Jun. 23, 1986 [CA] Canada ................................... 512249

[51] Int. Cl.<sup>4</sup> .............................................. B60P 7/00
[52] U.S. Cl. ..................................... 410/118; 410/144
[58] Field of Search ................ 410/118, 117, 143, 144

[56] References Cited

U.S. PATENT DOCUMENTS

| 3,224,385 | 12/1965 | Elsner | 410/117 |
| 3,782,758 | 1/1974 | Williamson, III | 410/117 |
| 4,167,144 | 9/1979 | Martins et al. | 410/117 |
| 4,168,667 | 9/1979 | Loomis | 410/144 |

Primary Examiner—Robert R. Song
Attorney, Agent, or Firm—Daryl W. Schnurr

[57] ABSTRACT

This invention relates to a load retainer and retention means for said load retainer for use in a transport vehicle so that the load retainer can be moved to any desired location within a transport vehicle but cannot be readily removed from said transport vehicle. Further, the retainer can be removably connected to opposing walls of the transport vehicle to provide a partition between different loads and to retain said loads in a particular position. The retainer has three parallel flexible belts that extend from side to side and are interconnected by a rectangular sheet of durable material. Each belt has two ends with hooks thereon. Each belt corresponds with support tracks on either side of the transport vehicle, the support tracks having a series of similar openings therein. The hooks can be inserted within the openings and the belts tightened so that the retainer is held in a fixed position within the transport vehicle. The retention means is a cable extending along one of the tracks that is removably affixed to said track by supports. The cable extends through a loop that is connected by an interconnecting belt to the retainer so that the retainer is slidably on the cable within the transport vehicle but cannot be removed from the transport vehicle without releasing the loop from the cable.

20 Claims, 3 Drawing Sheets

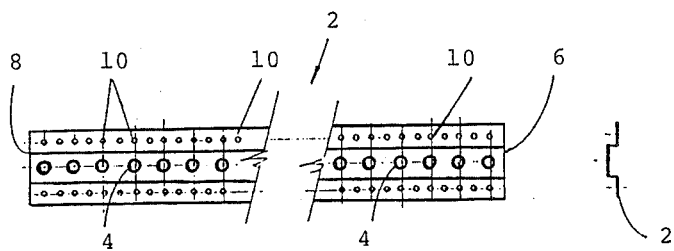
FIGURE 1    FIGURE 2
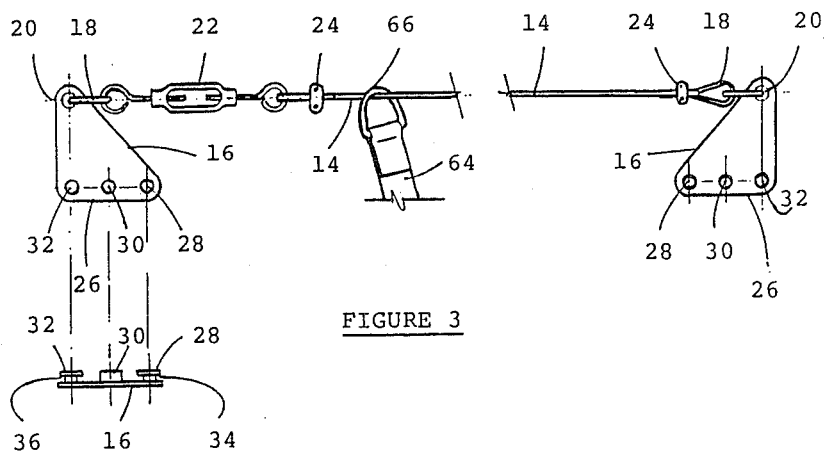
FIGURE 3
FIGURE 4
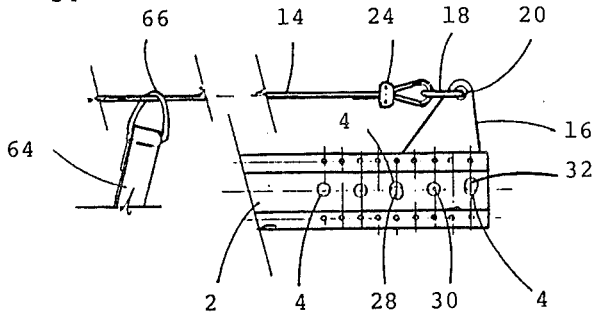
FIGURE 5

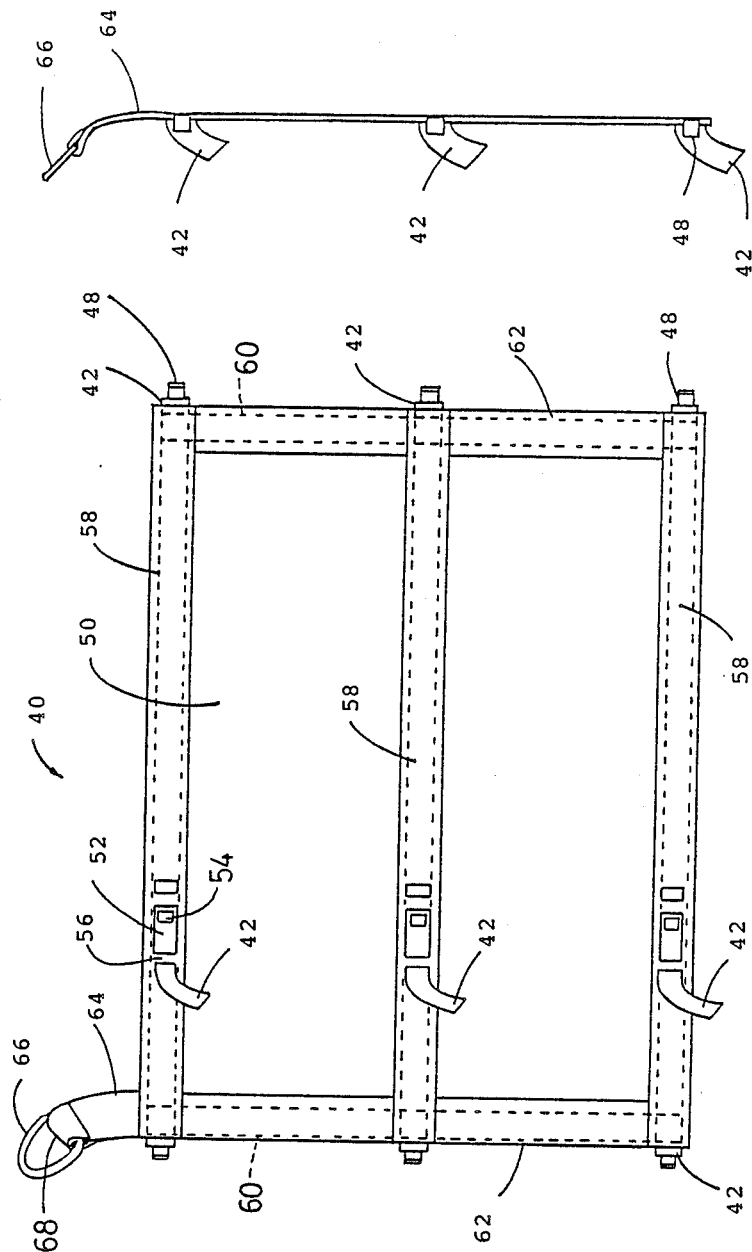

4,781,498

ADJUSTABLE LOAD RETAINER AND RETENTION MEANS FOR USE IN A TRANSPORT VEHICLE

BACKGROUND OF THE INVENTION

1. Field of the Invention

This invention relates to an adjustable load retainer and retention means for use in a transport vehicles and, in particular, to an adjustable load retainer that can be moved to various locations within the transport vehicle to divide and retain the load but cannot be readily removed from the transport vehicle.

2. Description of the Prior Art

It is known to have load dividers or retainers. Previous dividers have been sheets of wood such as plywood. Unfortunately, these sheets become lost over a period of time and must be replaced. Also, these sheets have no retention characteristics and do not prevent the load from shifting. Another known manner for retaining a load within a transport vehicle is to use spring-mounted rods that extend between support tracks on opposing walls of the transport vehicle. The support tracks are affixed to the side walls of the transport vehicle at particular heights, each support track on one side wall having a corresponding support track on the other side wall. The tracks extend from front to back of the transport vehicle and have a series of circular openings along their entire length. The circular openings of the support track on one side of the transport vehicle are aligned with and correspond to the circular openings of a similar track on the opposite side of the transport vehicle. Compressible spring-mounted rods can be extended between the opposing side walls with each end of the rod being located in one circular opening on either side of the transport vehicle. Often, there are three tracks on each side wall, said tracks being spaced approximately an equidistance from one another. Thus, when a load is placed in the transport vehicle, three rods can be placed in the same vertical plane to retain the load in position and separate it from a load to be subsequently placed within the transport vehicle to the rear of the first load. Since there are a series of circular openings in the tracks, the rods can be located in virtually any position along the length of the transport vehicle. Unfortunately, these rods are unsatisfactory in that they too can become lost and therefore must be replaced. Also, depending on the type of load that the rods are used to retain, parts of the load are able to pass between adjacent rods. Further, it takes some time to install the rods as three separate rods must be picked up and inserted into the appropriate openings. Also, there is no convenient location for the rods within the transport vehicle while the truck is being loaded or unloaded and the rods can constitute a hazard if stepped on.

SUMMARY OF THE INVENTION

It is an object of the present invention to provide an adjustable load retainer that can be located at virtually any location within a transport vehicle and retention means so that the retainer cannot be readily removed from the transport vehicle. It is a further object of the present invention to provide an adjustable load retainer and retention means that can make use of conventional tracks.

An adjustable load retainer for use in a transport vehicle, said vehicle having two opposing interior walls, with at least two tracks affixed to and extending longitudinally along each wall, each track having a series of equally-spaced openings therein. Each track on one of the opposing walls is aligned with a corresponding track on the other opposing wall. The load retention system has a retainer and elongated retention means the retainer having at least two flexible belts that are long enough to extend between the opposing walls. The belts are ineterconnected by suitable material and have means at either end to remove and attach the belts to the openings in said tracks. There are means to tighten or slacken each belt. The retention means is a filament extending between two supports along one wall only. The supports have nodules that can be releasably mounted in a spaced relationship on one of the tracks with each odule extending into a separate opening. The tension of the filament is adjustable so that the filament can be tightened or slackened between the two supports. The retainer has a loop attached thereto that surrounds said filament so that said retainer can be moved lognitudinally in various locations within said transport vehicle between said supports by sliding said loop along said filament. The loop maintains the retainer on said retention means, but said retainer is removable from said retention means by disconnecting said loop from said filament. The retention means is removable from said vehicle for installation in a second vehicle by slackening the filament tension.

BRIEF DESCRIPTION OF THE DRAWINGS

In the drawings:

FIG. 1 is a side view of a conventional track;

FIG. 2 is an end view of the track of FIG. 1;

FIG. 3 is a side view of elongated retention means for a load retainer;

FIG. 4 is an end view of one support of said retention means of FIG. 3;

FIG. 5 is a side view of one support of an elongated retention means mounted in a conventional track;

FIG. 6 is a side view of a load retainer in accordance with the present invention;

FIG. 7 is an end view of the load retainer of FIG. 6; and

DESCRIPTION OF A PREFERRED EMBODIMENT

Figure 8:
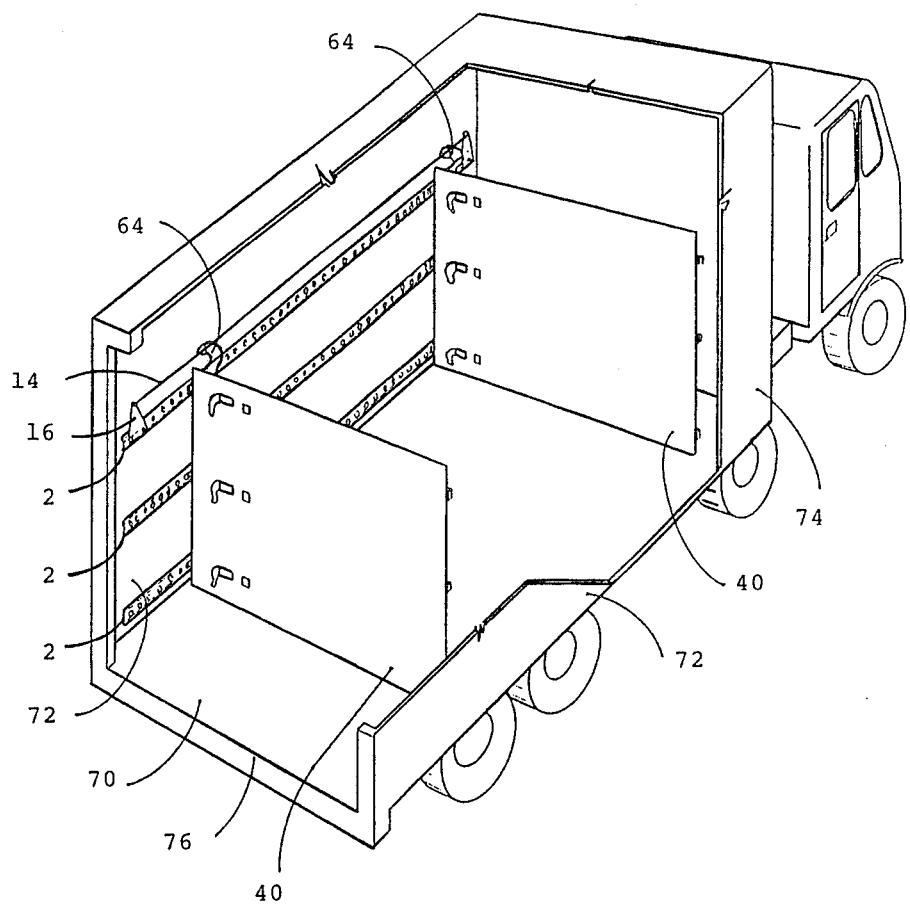
FIG. 8 is a partial cut-away perspective view of an interior of a transport vehicle having two load retainers installed therein.

When the term "transport vehicle" is used in this specification, it shall be deemed to mean any vehicle that can be used to transport goods in a relatively large quantity including, without limiting the generality of the foregoing, truck bodies, trucks, trailer bodies, trailers, rail cars and airplanes.

Referring to FIG. 1 in greater detail, a support track 2 has a series of circular openings 4, the openings 4 are equidistant from one another and extend from a front 6 to a back 8 of said track 2. The small openings 10 along each edge of the track 2 are used to receive screws or nails (not shown in FIG. 1) to attach the track 2 to an interior wall of a transport vehicle. FIG. 2 is an end view of the track 2. The track 2 is conventional and is presently used in many truck bodies to support rods for retaining a load in a particular position.

In FIG. 3, there is shown an elongated retention means 12 having a cable 14 with supports 16 located at either end thereof. The cable 14 is affixed to said supports 16 by loops 18 through small apertures 20. Means 22 for adjusting the tension of the cable 14 is located between one of the loops 18 and the cable 14. The cable 14 also has clamps 24 to hold it in position on the desired loops. The supports 16 are flat plates having a triangular shape with a base 26. Three spaced nodules 28, 30, 32 extend from said plate along said base 26. Each nodule has a shape similar to the shape of the openings 4 in said track 2 but being slightly smaller than said openings so that the nodules can readily fit within said openings 4.

As can best be seen from FIG. 4, the two outer nodules 28, 32 each have a narrow neck 34, 36 respectively, each neck having a depth slightly greater than the thickness of the track 2 in the area surrounding each opening 4. The centre nodule 30 is cylindrical in shape.

As shown in FIG. 5, the three nodules 28, 30, 32 are spaced so that they fit within three adjacent openings 4 of the track 2.

When each support 16 is mounted on the track 2, the nodules 28, 30, 32 are aligned with and inserted into three suitable openings 4. The weight of the cable 14 causes a top end 38 of the two supports 16 (only one of which is shown in FIG. 5) to tilt toward one another so that the nodule 28 rests on the neck 34 in a lower portion of the opening 4 in which the nodule 28 is inserted and the nodule 32 rests on the neck 36 in an upper portion of the opening 4 in which the nodule 32 is inserted. This tilting of the supports 16 affixes the supports to the track 2. The tension of the cable 14 is then tightened by turning the means 22 in an appropriate direction. By turning the means 22 in an opposite direction, the tension in the cable 14 can be slackened and the supports 16 can be manually tilted away from one another so that the nodules 28, 30, 32 are aligned with the openings 4. In that position, the supports 16 can be removed from the track 2.

As shown in FIG. 6, an adjustable load retainer 40 has three flexible belts 42 only part of which are shown in FIG. 6. The belts 42 are long enough to extend across the entire width of the retainer 40. Each of the belts 42 has two ends 44 with means at either end to removably connect one end of said belt to an opening 4 in one track 2 and the other end of said belt to an opening 4 in another track 2. The means to removably connect said ends of said belts 42 to said openings 4 are hooks 48. Material 50 interconnects the belts 42. The material interconnecting said belts is a sheet extending between the belts, said sheet being rectangular and extending between substantially the entire length of the belts.

There are means 52 to slacken or tighten each belt 42. The means 52 is a buckle 54 and a bracket 56. Part of the belt 42, henceforth referred to as a strap, extends through the bracket 56. The bracket 56 and buckle 54 are conventional and are essentially the same as a seatbelt in a motor vehicle. The strap 42 is wound around a roller (now shown) in the bracket 56. When the buckle 54 is closed and each of the hooks 48 are inserted into suitable openings 4 of the track 2, the belt can be tightened by pulling on the strap. When it is desired to slacken the belt 42, the buckle 54 can be depressed and the belt 42 will slacken, thereby allowing the hooks 48 to be removed from the openings 4.

The rectangular sheet 50 has three elongated pockets 58 extending from side to side of the retainer 40, with one belt 42 extending through each pocket 58 so that the two ends of each belt extend to either side of the retainer 40. The three belts 42 are substantially parallel to one another. For strength purposes, there are preferably two vertical belts 60, shown by dotted lines, extending through pockets 62 on either side of said retainer 40. At one corner of the retainer 40, there is located an interconnecting belt 64 having a loop 66 affixed at an end 68 thereof. The interconnecting belt 64 is rigidly affixed to the retainer 40 and, as shown in FIGS. 3 and 5, the cable 14 can be inserted through the loop 66 so that the retainer 40 can slide in virtually any position along the cable 14 but cannot be readily removed from the cable 14. Preferably, the loop 66 can be opened when it is desired to remove the retainer 40 entirely from the cable 14. Thus, the retainer 40 cannot be readily separated from the retention means 12.

As shown in FIG. 8, the retainer 40 can be used in a transport vehicle 70, said body 70 having two opposing interior walls 72 extending from a front 74 to a back 76 of said transport vehicle 70. Three support tracks 2 extend from front to back along each wall 72. For ease of illustration, the tracks are shown in FIG. 8 on only one of the two opposing interior walls 72. Each of the support tracks is affixed to the wall 72 and has a series of similar equidistant circular openings 4 that have been previously described. The flexible belts 42 of the retainer 40 are long enough to extend from one wall 72 to the other wall 72. Each belt 42 has two ends with the hooks 48 at either end removably connected to an opening 4 in a track 2 on each of the walls 72.

The location of the three tracks 2 on each of the opposing walls 72 correspond to one another. The openings 4 on the corresponding tracks 2 also correspond to one another. The tracks 2 are on the side walls 72 of the transport vehicle 70.

The supports 16 are preferably mounted in an upper track 2 in the transport vehicle 70 and, still more preferably, the loop 66 can be opened to remove the retainer 40 from the cable 14. In FIG. 8, there are two retainers 40 mounted on he cable 14 within the transport vehicle 70. However, any reasonable number of retainers can be used within a particular transport vehicle.

The retainers of the present invention can be usdd with virtually any size of truck from vans or small pickup trucks to tractor trailers. Also, while the retainer is preferably mounted from side to side, it could also be mounted from ceiling to floor of a transport vehicle. It is not necessary that the transport vehicle be entirely enclosed as long as the transport vehicle has two opposing walls where the tracks and therefore the retainers can be mounted. Since the loops 66 cannot be readily removed from the cable 14 once the retention means 12 is properly installed in a particular transport vehicle and since there is no need to remove the retainers 40 from the cable 14 during loading or unloading, it is very unlikely that any of the retainers 40 will become lost or misplaced. Thus, the expense and inconvenience of obtaining replacement retainers will be greatly reduced.

While the retainer 40 shown in FIG. 6 has a rectangular sheet that covers the entire area between the belts 42 a retainer could be designed, within the scope of the attached claims, where there was no sheet or only part of a sheet and the space between the various belts was entirely open or partially open. Similarly, while the belts 42 shown in FIG. 6 are parallel to one another, a retainer could be designed within the scope of the attached claims where the belts were not parallel. For example, a retainer could be designed having two or more belts where each pair of belts crossed at or near a centre in the form of an "X". The space between the belts could then be filled by a sheet or left open. Any suitable material can be used for the belts and for the rectangular sheet of material. One suitable material for the belts is woven nylon and one suitable material for the rectangular sheet is a vinyl coated polyvinyl chloride weaved curtain. Obviously, it is beneficial to have the retainer constructed of durable materials of sufficient strength to retain the type of load with which the retainers are used.

Since the tracks 2 are conventional, the retainer and retention means in accordance with the present invention can be used in any truck that already has tracks installed or in which tracks can be installed. By utilizing the present invention, the load being carried in the transport vehicle is less likely to become mislocated during transit and the cost of replacing the retainers will be greatly reduced as it is very unlikely that any of the retainers will be lost or misplaced. During loading or unloading, the retainers can be inserted quickly and they do not present a hazard when they are disconnected and simply hanging loosely from the cable 14.

While the retainer and retention means have been described for particular use with a truck body, it is understood that the retainer and retention means can be used with any transport vehicle. Also, while the racks have been specifically described as being conventional, the invention could be used with different types of racks and with virtually any means whereby the ends of the belts can be removably affixed to a wide variety of locations on opposing walls. In most uses, a track could be used to retain the retainer on the opposing walls. Numerous other variations, within the scope of the attached claims, will be readily apparent to those skilled in the art. Various materials will be suitable to make the load retainer and retention means of the present invention. Preferably, the supports 16 will be made of steel or hard molded plastic. Other suitable materials will be readily apparent to those skilled in the art.

What I claim as my invention is:

1. An adjustable load retention system for use in a load transport vehicle, said vheicle having two opposing interior walls, with at least two tracks affixed to and extending longitudinally along said two opposing walls, each track having a series of equally-spaced openings therein, each track on one opposing wall being aligned with a corresponding track on the other opposing wall, said system comprising a retainer and elongated retention means, the retainer having at least two flexible belts that are long enough to extend between the opposing walls, said belts being interconnected by suitable material, said belts having means at either end to removably attach the belts to the openings in said tracks, with means to tighten or slacken each belt, saids retention means being a filament extending between two supports along one wall only, said supports having nodules so that the supports can be releasably mounted in a spaced apart relationship on one of the tracks with each nodule extending into a separate opening, the tension of said filament being adjustable so that the filament can be tightened or slackened between the two supports, said retainer having a loop attached thereto that surrounds said filament so that said retainer can be moved longitudinally to various locations within said transportion vehicle between said supports by sliding said loop along said filament, said loop maintaining said retainer on said retention means, but said retainer being removable from said retention means by disconnecting said loop from said filament and said retention means being removable from said vehicle for installation in a second vehicle by slackening the filament tension.

2. A retainer as claimed in claim 1 wherein the filament is a cable extending along one track and being removably affixed to said track by said two supports.

3. A retainer as claimed in claim 2 wherein the means at either end of each belt to removably connect the belts to an opening is a hook.

4. A retainer as claimed in claim 2 wherein the tracks are on the side walls of the transport vehicle.

5. A retainer as claimed in claim 2 wherein there are three tracks on each of the two opposing walls of the transport vehicle and the retainer has three belts.

6. A retainer as claimed in any one of claims 1 or 2 wherein the belts are substantially parallel to one another.

7. A retainer as claimed in claim 2 wherein the retainer has a loop conencted thereto that surrounds said cable to slidably retain said retainer on said retention means.

8. A retainer as claimed in claim 7 wherein the loop is connected to a remaining part of said retainer by an interconnecting belt.

9. A retainer as claimed in any one of claims 7 or 8 wherein the loop can be opened.

10. A retainer as claimed in claim 2 wherein each support is a flat plate having a base, with three spaced nodules extending from said plate along said base, each nodule having a shape similar to and a size slightly smmaller than the openings in said track so that one nodule can readily fit within any opening.

11. A retainer as claimed in claim 10 wherein the three nodules are spaced so that they fit within three separate openings of a track, the two outer nodules having a narrow neck, said neck having a depth slightly greater than the thickness of the track surrounding each opening, a centre nodule being cylindrical in shape.

12. A retainer as claimed in claim 11 wherein the three nodules are spaced so that they fit within three adjacent openings of a track.

13. A retainer as claimed in claim 2 wherein the two supports have a triangular shape.

14. A retainer as claimed in claim 8 wherein the supports are mounted in an upper track and the loop can be opened to remove the retainer from the cable.

15. A retainer as claimed in claim 13 wherein the belts are made of woven nylon and the suitable material is vinyl coated polyvinyl chloride material.

16. A retainer as claimed in any one of claims 2, 8 or 14 wherein there is more than one retainer mounted on the cable, within the transport vehicle.

17. A retainer as claimed in any one of claims 2, 11 or 13 wherein the cable has a means for adjusting the tension thereof and the supports and cable can be removed or installed on a track by adjusting the tension of said cable.

18. A retainer as claimed in any one of claims 2, 7 or 8 wherein the material interconnecting the belts is a sheet extending between the belts.

19. A retainer as claimed in any one of claims 2, 7 or 8 wherein the material is a rectangular sheet having elongated pockets extending from side to side of the retainer, with one belt extending through each pocket with the two ends of each belt to either side of said retainer.

20. A retainer as claimed in any one of claims 2, 7 or 8 wherein the means to slacken or tighten each belt is a buckle and a clasp to vary the tension in each belt.

* * * * *